United States Patent [19]

Mallinson

[11] Patent Number: 4,969,717

[45] Date of Patent: Nov. 13, 1990

[54] OPTICAL SWITCH

[75] Inventor: Stephen R. Mallinson, Ipswich, England

[73] Assignee: British Telecommunications Public Limited Company, United Kingdom

[21] Appl. No.: 303,662

[22] PCT Filed: Jun. 3, 1988

[86] PCT No.: PCT/GB88/00438

§ 371 Date: Jan. 23, 1989

§ 102(e) Date: Jan. 23, 1989

[87] PCT Pub. No.: WO88/09951

PCT Pub. Date: Dec. 15, 1988

[30] Foreign Application Priority Data

Jun. 3, 1987 [GB] United Kingdom ............... 8713043

[51] Int. Cl.$^5$ ........................... G02F 1/13; G02B 5/30
[52] U.S. Cl. ................................. 350/335; 350/334; 350/347 R; 350/338; 350/378; 350/400
[58] Field of Search .............. 350/335, 334, 377, 378, 350/400, 403, 347 E, 347 R, 338

[56] References Cited

U.S. PATENT DOCUMENTS

| 3,540,795 | 1/1969 | Harris | 350/400 |
| 3,719,414 | 3/1973 | Wentz | 350/403 |
| 4,129,357 | 12/1978 | Title | 350/403 |
| 4,461,543 | 7/1984 | McMahon | 350/403 X |
| 4,575,193 | 3/1986 | Greivenkamp, Jr. | 350/403 |

OTHER PUBLICATIONS

Soref & McMahon; "Calcite 2×2 Optical Bypass Switch Controlled by Liquid Crystal Cells", Optics Letters, vol. 7, No. 4, 1982.
Schmidt; "A High Speed Digital Light Beam Deflector", Physics Letters, vol. 12, No. 3, 1964.
Kulcke et al.; "A Fast Digital Indexed Light Deflector", IBM Journal, vol. 6, No. 10, Mar. 1964.
Schmidt; "Electro-Optic Deflection of a Laser Beam", Philips Technical Review, vol. 36, No. 5, 1976.
Nelson; "Digital Light Deflection", The Bell System Technical Journal, vol. XLIII, No. 3, May 1964.

Primary Examiner—Stanley D. Miller
Assistant Examiner—Huy K. Mai
Attorney, Agent, or Firm—Nixon & Vanderhye

[57] ABSTRACT

An optical switch includes a series of $2(n-1)$ macro-cells each having a variable polarization rotating cell and a birefringent cell. Each rotating cell is divided into individually addressable and switchable sub-cells. Some of the macro-cells have birefringent cells having a first orientation. In these macro-cells, sub-cells switch light passing through position Pi to either position Pi or Pi+1 of the rotating cell of the next macro-cell in the series. Other macro-cells have birefringent cells having a second orientation. In these macro-cells, the sub-cells switch light passing through position Pi to either position Pi or Pi−1 of the rotating cell of the next macro-cell in the series. The sub-cells of the macro-cells are positioned such that light from any one of several inputs is switchable independently to any one of several outputs.

18 Claims, 4 Drawing Sheets

→→ } STRAIGHT THROUGH RAY TRACES

⇉ } CROSSED RAY TRACES

↕ POLARISATION IN PLANE OF PAPER

⊗ POLARISATION PERPENDICULAR TO PLANE OF PAPER

SWITCH STATE TABLE

| INPUT POLARISATION | S11 | S21 | S12 | S22 | |
|---|---|---|---|---|---|
| ↕ | ON | ON | ON | ON | STRAIGHT-THROUGH |
| ↕ | OFF | x | ON | OFF | CROSS SWITCH |
| ⊗ | OFF | ON | OFF | ON | STRAIGHT-THROUGH |
| ⊗ | ON | x | OFF | OFF | CROSS SWITCH | x = EITHER 8 x 8 NON BLOCKING SWITCH SHOWING
SWITCHING BETWEEN PORTS 1 AND 16
AND PORTS 6 AND 10

FIG.5(a) CALCITE

BIREFRINGENCE = 1.116

FIG.5(b) SODIUM NITRATE

BIREFRINGENCE = 1.188

OPTICAL SWITCH

Optical signal processing and transmission techniques, such as those used in telephony, give rise to the need for devices capable of switching light between points separated in space. Although space switching can be achieved using waveguides such as fiber optic cables in combination with suitable couplers there are many situations in which it would be advantageous to use free space switching of unguided beams for example in image switching. However, the known free space optical switches involve the use of complex systems of precisely aligned optical components such as lenses and are not suitable for industrial application.

It is well known that certain classes of material, such as calcite, are birefringent. When an object is viewed in unpolarized light through a cell formed of such a material two spatially separated images are observed separated by an amount determined by the thickness and orientation of the cell. The two images observed are polarized in orthogonal planes and the observed separation of the images results from the property of birefringent materials that light is refracted through different angles, that is it is either ordinarily or extraordinarily refracted, according to its polarization state.

A cell of birefringent material is used in conjunction with a variable polarization rotating cell such as a liquid crystal cell of the type used, for example, in liquid crystal display devices. The liquid crystal cell may be of the twisted nematic crystal type. When a nematic liquid crystal is aligned homogeneously in a thin cell with 90° between the direction of orientation of crystals in the upper and lower surfaces it exhibits a twisted planar structure which has the property that the plane of polarization of plane polarized light incident upon the cell is rotated through 90°. When an electric field is applied across the cell the molecules of the nematic liquid crystal align themselves along the field lines thus destroying the twisted structure and removing the polarization rotation property.

Alternatively a liquid crystal cell with crystals uniformly aligned in a single direction may be used. If the liquid crystal molecules of such a cell are aligned at an angle T to the plane of polarization of incident light then the cell rotates the plane of polarization of the light through a total angle of 2T. Orienting the crystals at 45° to the plane of polarization therefore results in rotation of incident plane polarized light through 90°. If the thickness and birefringence of the cell are chosen appropriately the cell functions as a $\lambda/2$ phase plate. The required birefringence can be achieved by applying a bias voltage across the cell to tilt the molecules. The cell is switched "OFF", i.e. into the state in which the plane of polarization of incident light is not rotated, by applying a large voltage across the cell to align the crystals in such a direction that the birefringence of the cell is effectively removed.

Such a cell can switch light between two orthogonal polarization states in response to a field applied to the liquid crystal cell. By arranging a birefringent cell adjacent the liquid crystal cell with its optical axis oriented so that ordinarily and extraordinarily refracted rays are directed to two different positions it is possible to switch the light between these two positions in response to the switching between orthogonal polarization states effected by the liquid crystal cell. Such an arrangement is disclosed in a short communication in the IBM Journal of Jan. 1964 entitled "A Fast, Digital-Indexed Light Deflector" by Kulke et al. (pages 64 to 670).

According to the present invention an optical switch comprising:

a series of $2(n-1)$ macro-cells, each having a variable polarization rotating cell with up to n individually addressable sub-cells each located at one of n positions P1 to Pn and a birefringent cell;

$(n-1)$ birefringent cells being orientated relative to light passing through so that light passing through a subcell (at position Pi) is switchable to pass through positions Pi or Pi+1 of the variable polarization rotating cell of the next macro-cell in the series, and $(n-1)$ birefringent cells being orientated relative to light passing through so that light passing through a sub-cell (at position Pi) is switchable to pass through position Pi or Pi−1 of the variable polarization rotating cell of the next macro-cell in the series, the subcells being positioned to provide that light from any one of n inputs is switchable independently to any of n outputs, where $n>1$.

For convenience of manufacture the macro-cells may have an addressable sub-cell at each of the n positions even though redundant sub-cells may not be addressed. The redundant sub-cells can be readily determined and omitted before manufacture if desired. The macro-cells can be placed in any order. One convenient arrangement is to construct pairs of macro-cells of different birefringent orientation which can then be assembled with like pairs to form the optical switch. Another is to group like orientation macro-cells together.

As an alternative to liquid crystals the variable polarization rotating cell may be made of a material such as PLZT crystals.

A device in accordance with the present invention is now described in detail with reference to the accompanying drawings, in which.

Figure 1:
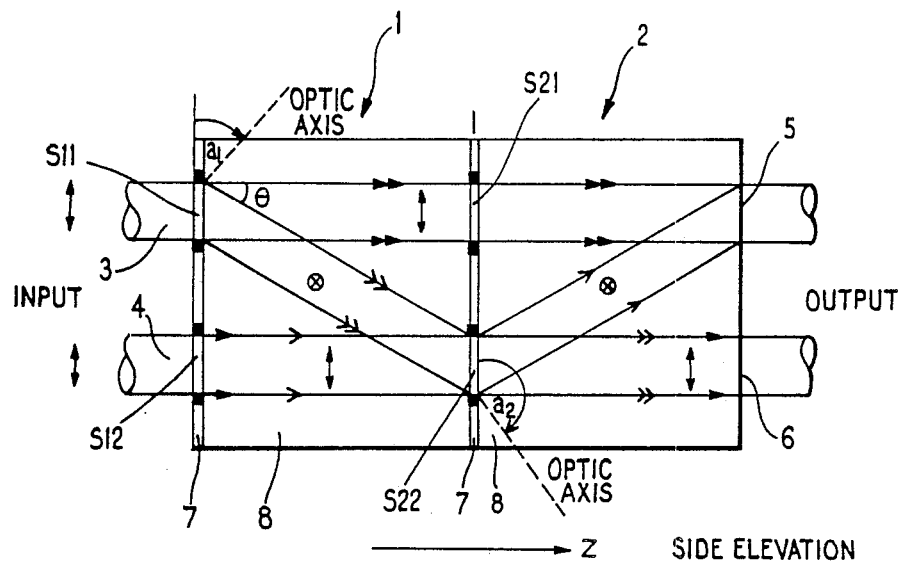
FIG. 1 is a side elevation of a first embodiment of the present invention with light rays indicated diagrammatically.

An optical space switch comprises two macro-cells 1, 2 arranged in series between inputs 3, 4 and outputs 5, 6. Each macro-cell 1, 2 comprises a substantially planar liquid crystal cell 7 and a calcite crystal 8 of rectangular cross-section positioned immediately adjacent the liquid crystal cell 7.

The liquid crystal cell 7 is formed from twisted-nematic liquid crystals. The area of each liquid crystal cell 7 is divided into sub-cells S, each sub-cell being aligned with an input 3, 4 of the switch. Electrodes (omitted for clarity) are used to apply fields to the sub-cells S in order to switch the sub-cells S from a state in which they rotate incident plane polarized light by 90° to a state in which they transmit plane polarized light without rotation.

The optical axes of the macro-cells 1, 2 are arranged to lie in different directions. The direction of the optical axis of the first macro-cell 1 and the dimensions of the first macro-cell 1 are chosen so that plane polarized beams from either of the inputs 3, 4 incident upon the calcite crystal 8 via the liquid crystal 7 are ordinarily or extraordinarily refracted along a path such that they impinge upon either of the sub-cells S of the liquid crystal cell 7 of the second macro-cell 2. The orientation and dimensions of the second macro-cell 2 are in turn chosen so that beams from the sub-cells S of the liquid crystal cell 7 of the second macro-cell 2 are refracted along paths such that they impinge upon one or other of the outputs 5, 6 of the switch. When, as in FIG. 1, the macro-cells are of the same shape and dimensions, the angles $a_1$, $a_2$ between the optical axes of the macro-cells 1 and 2 respectively and the plane surfaces of the cells are such the $a_1 + a_2 = 180°$.

The switch of FIG. 1 functions as a 2×2 cross point parallel-beam switch capable of independently switching light from any one of the inputs 3, 4 to any one of the outputs 5, 6. Consider a beam from the input 3, initially polarized in the plane of the paper. (For ease of reference in the following discussion the notation Snm is used where n is the macro-cell number, m the sub-cell number). When S11 is switched off, the plane of polarization of the beam is rotated by the sub-cell through 90° to be normal to the plane of the paper. Light of this polarization state is extraordinarily refracted at an angle $\theta$ and propagates to impinge on sub-cell S22. When this sub-cell S22 is switched off the plane of polarization is again rotated through 90°. The beam is ordinarily refracted at this cell S22 and, since its angle of incidence to the crystal of the second macro-cell 2 is zero, the beam continues to propagates parallel to the z-axis, finally leaving the switch through the output 6. Similarly it may be shown that with S12 switched on, light from input 4 is switched to output 5. This is the "crossed" switch condition. The "straight-through" condition is arranged by having all the sub-cells S11, S12, S21, and S22 switched on.

Figure 2:
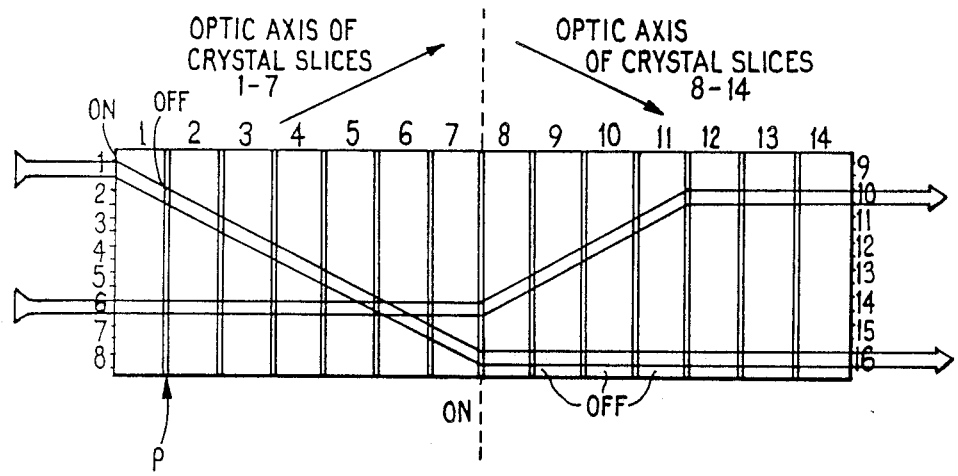
FIG. 2 is a side elevation of an alternative embodiment of the present invention.
Figure 3:
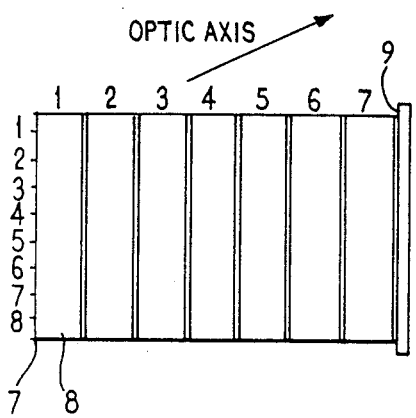
FIG. 3 is a side elevation of a further alternative embodiment of the present invention.

The principle upon which the 2×2 switch is constructed may be extended to linear arays of n inputs and outputs. Non-blocking (i.e. independent) switching is then achievable through the use of 2(n−1) macro-cells. Thus, for example, an 8×8 switch as shown in FIG. 2 comprises fourteen macro-cells arranged in series, the first seven macro-cells having optical axes in one direction and the other seven macro-cells having optical axes in a second direction. Alternatively a switch for directing light from one of the eight inputs back to one of the other inputs may be constructed using 7 macro-cells with axes in one direction and a mirror surface 9 adjacent the seventh macro-cell, as shown in FIG. 3. The same calcite blocks present different orientations to light passing in the different directions thus light passing from the inputs and back again will pass through fourteen macro-cells, seven of each orientation.

Figure 4:
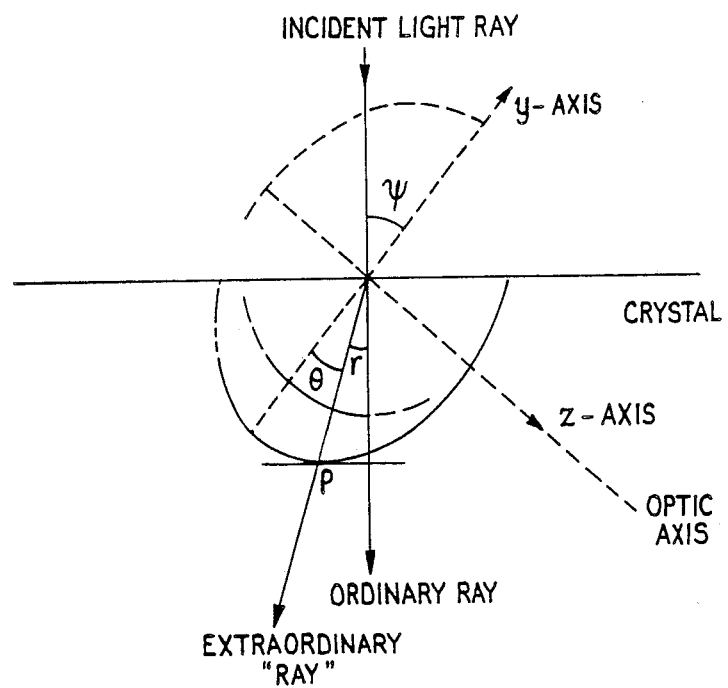
FIG. 4 is a ray diagram illustrating birefringence.
Figure 5C:
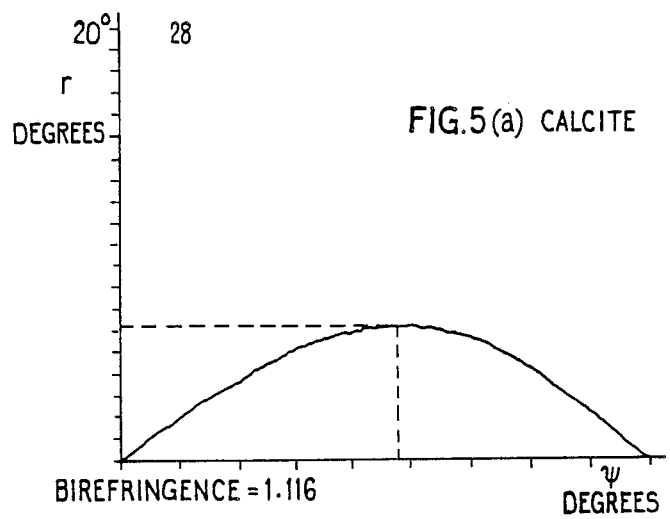
FIGS. 5A and 5B are graphs illustrating the birefringent properties of calcite and sodium nitrate respectively.

The choice of an appropriate orientation and dimensions for the macro-cells of a switch in accordance with this invention requires knowledge of the angular offset r between the extraordinary and ordinary rays characteristic of a particular orientation of the birefringent material. Applying the method of secondary wavelets due to Huygens to a ray normally incident upon a crystal plane as shown in FIG. 4 it may be shown that the angular offset r is related to the angle $\psi$ characteristic of the orientation of the crystal by the equation $$\tan r = \frac{((V_\parallel / V_\perp)^2 - 1)\tan(\psi)}{(V_\parallel / V_\perp)^2 + \tan^2(\psi)}$$

where $v_\perp$ is the velocity of light perpendicular to the optical axis and $v_\parallel$ is the velocity of light parallel to the optical axis. The ratio $v_\parallel / v_\perp$ is constant characteristic of a particular birefringent material and so, provided this characteristic constant is known, r may be calculated for any given value of $\psi$. FIGS. 5a and 5b show r as a function of $\psi$ for calcite and sodium nitrate respectively.

Figure 5C:
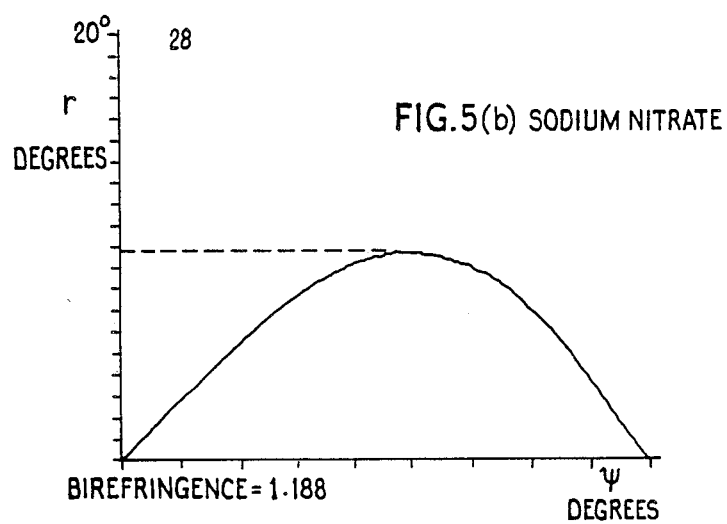
Figure 5C:
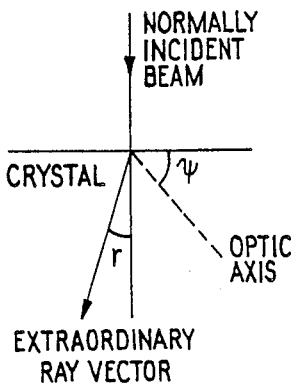

Once the angular offset for the birefringent material of the switch is known it is possible to calculate the appropriate dimensions for the macro-cells. A typical value for the 1/e width of a beam being switched is 500 microns, this width being achievable through the use of rod lenses. To allow independent switching of the beams it is necessary that after passing through a macro-cell a displaced beam should be shifted by at least one beam diameter laterally. Referring to FIG. 5 the maximum angular offset available in calcite is found to be 6.2° which occurs when the optical axis is at an angle of 48° to the surface. In sodium nitrate, which may be used as an alternative to calcite, the maximum angular offset R is increased to 10°. Using calcite, which has the advantage that large defect-free crystals are easier to manufacture, and allowing 800 microns beam offset at the exit, the necessary thickness of the calcite crystal for each macro-cell is 800/tan(6.2°), i.e. 7.4 mm. Twisted nematic liquid crystal cells can be fabricated with a thickness of approximately 2 mm giving a total thickness for the macro-cell of approximately 10 mm. Thus the total thickness t for an 8×8 switch is given by $$\begin{aligned} t &= 2(8 - 1) \times 10 \text{ mm} \\ &= 140 \text{ mm}. \end{aligned}$$

It is possible to calculate from the properties of the materials used the performance of an 8×8 switch in terms of insertion loss, cross talk and switch speed.

Assuming that anti-reflection coatings or index-matching materials between each dielectric interface and high impedence ITO (Indium Tin Oxide) coatings in the liquid crystal cell are used, the insertion loss should be reducible to 0.2 dB per cell. The propagation loss within the calcite crystal is typically less than 0.1 dB per centimetre. Thus the total insertion loss for an 8×8 switch using calcite crystals as the birefringent material is typically 4 dB (neglecting losses on coupling to external components). This figure may be further improved by the use of stressed polymer sheets in place of the birefringent crystals of calcite, such sheets being capable of offering both high transparency and high birefringence.

The cross-talk within the switch will largely be determined by the efficiency of the twisted nematic liquid crystal cells. Gooch and Parry have shown in a paper published in Elect Lett 10,1, page 2, 1974 that the extinction ratio between parallel polarizers is found to be better than 1% and at periodic values of wavelength the extinction is found to be indistinguishable from zero. The distribution of cross-talk in the switch will be strongly affected by the particular switching state of the matrix of elements making up the switch. Total cross-talk is typically less than 30 dB.

The dominant factor in limiting the speed of the switch is the nematic switch-off time, which is determined by bulk fluid flow considerations within the liquid crystal. Using thin twisted nematic liquid crystal cells with commercially available nematic mixtures a switch-off period of 30 ms is obtainable. A further improvement of a few tens of per cent may be attained by doping the nematic with a cholesteric. Further improvements in the performance of standard liquid crystal cells may be obtained by suitable surface treatments and the use of appropriate nematic mixtures. However to gain a significant increase in speed with a switch-off period of 30 $\mu$s or less it is desirable to use smectic C ("ferro-electric") liquid crystals.

The optical switch according to the present invention can switch optical images and thus has application to the switching of spatially multiplexed optical buses for example.

I claim:

1. An optical switch comprising:
   a series of 2(n−1) macro-cells each having a variable polarization rotating cell with up to n individually addressable sub-cells, each of said sub-cells being located at one of n positions P1 to Pn, and a birefringent cell adjacent said rotating cell;
   (n−1) of said birefringent cells being in a first orientation so that light passing through an addressable sub-cell position Pi is switchable to pass through either of sub-cell positions Pi or Pi+1 of said rotating cell of the next macro-cell in said series, and
   (n−1) birefringent cells being in a second orientation so that light passing through an addressable sub-cell position Pi is switchable to pass through either of sub-cell positions Pi or Pi−1 of said rotating cell of the next macro-cell in said series,
   said sub-cells being positioned to provide that light from any one of m inputs is switchable independently to any of m outputs, where m is less than or equal to n and greater than 1.

2. An optical switch as claimed in claim 1 in which said variable polarization rotating sub-cells are liquid crystal cells.

3. An optical switch as claimed in claim 2 in which said liquid crystal is a smectic c liquid crystal.

4. A optical switch as claimed in any one of claims 1 through 3 in which said birefringent cells are calcite crystals.

5. An optical switch as claimed in any one of claims 1, 2, or 3 in which said birefringent cells comprise stressed polymer sheets.

6. An optical switch as claimed in any one of claims 1, 2 or 3 which macro-cells having birefringent cells of the same orientation are grouped together.

7. An optical switch as claimed in any one of claims 1, 2 or 3 in which said macro-cells are grouped in pairs of macro-cells, each of said pairs including said first orientation and said second orientation birefringent cells.

8. An optical switch having a series of macro-cells, each said macro-cell comprising:
   a variable polarization rotating cell divided into sub-cells, each of said sub-cells being located at one of n positions P1 to Pn;
   a birefringent cell adjacent to said rotating cell;
   said birefringent cell in each of a first portion of said macro-cells having a first orientation, said sub-cells being switchable so that light entering sub-cell position Pi in one of said first portion macro-cells passes through to either sub-cell position Pi or Pi+1 in the next macro-cell in said series;
   said birefringent cell in each of a second portion of said macro-cells having a second orientation, said sub-cells being switchable so that light entering sub-cell position Pi in one of said second portion macro-cells passes through to either sub-cell position Pi or Pi−1 in the next macro-cell in said series, and
   said sub-cells being positioned to direct light from any one of a plurality of inputs to any one of a plurality of outputs.

9. An optical switch as in claim 8 having 2(n−1) of said macro-cells, and in which the number said first portion of macro-cells is (n−1), and the number of said second portion macro-cells is (n−1).

10. An optical switch comprising:
    a series of macro-cells each having a variable polarization rotating cell with up to n individually addressable sub-cells and a birefringent cell adjacent to said rotating cell;
    each of said sub-cells located at one of n positions P1 to Pn, said sub-cells being switchable so that light entering sub-cell position Pi in one of said macro-cells passes through to either sub-cell position Pi or Pi+1 in the next macro-cell in said series;
    a mirror adjacent to the last macro-cell in said series, said mirror reflecting light exiting said last macro-cell, and
    said sub-cells being positioned to direct light from any one of m inputs back to any one of said m inputs, where m is less than or equal to n and greater than one.

11. An optical switch as in claim 10 in which said rotating sub-cells comprise liquid crystal cells.

12. An optical switch as in claim 11 in which said liquid crystal cells comprise smectic c liquid crystals.

13. An optical switch as in any one of claims 10–12 in which said birefringent cells comprise calcite crystals.

14. An optical switch as in any of claims 10–12 in which said birefringent cells comprise stressed polymer sheets.

15. An optical switch including a series of cascaded macro-cell switches, each said macro-cell switch comprising:
    a birefringent cell; and
    an plurality of individually controllable polarization rotating sub-cells located adjacent said birefringent cell at corresponding n optical input/output port positions P1 to Pn;
    said birefringent cell having predetermined orientation and dimensions to cause optical signals from a given input port position Pi to pass (a) to the same output port position Pi or (b) to a next adjacent output port position (Pi+1 or Pi−1) depending upon the state of the corresponding polarization rotating cell and the orientation of said birefringent cell.

16. An optical switch as in claim 15 having 2(n−1) macro-cell switches and having n of said polarization rotating sub-cells disposed in a linear array adjacent an input face of the birefringent cell for each said macro-cell switch.

17. An optical switch as in claim 15 having 2(n−1) macro-cell switches and having (n−1) of said macro-cell switches with birefringent cells of a first orientation and having (n−1) of said macro-cell switches with birefringent cells of a second orientation, macro cells having said first orientation directing optical signals input at Pi to output position Pi+1 depending upon the state of the ith polarization rotating sub-cell for that macro-cell;

macro-cells having said second orientation directing optical signals input at Pi to output position Pi−1 depending upon the state of the ith polarization rotating sub-cell for that macro-cell.

18. An optical switch as in claim 15 further comprising:
a reflective surface disposed at the output of said series of cascaded macro-cell switches so as to redirect output optical signals back through the macro-cells.

* * * * *